H. W. WHITE & A. T. SHELDON.
ANTISKIDDING DEVICE FOR VEHICLE TIRES.
APPLICATION FILED SEPT. 21, 1912.
1,152,065.
Patented Aug. 31, 1915.
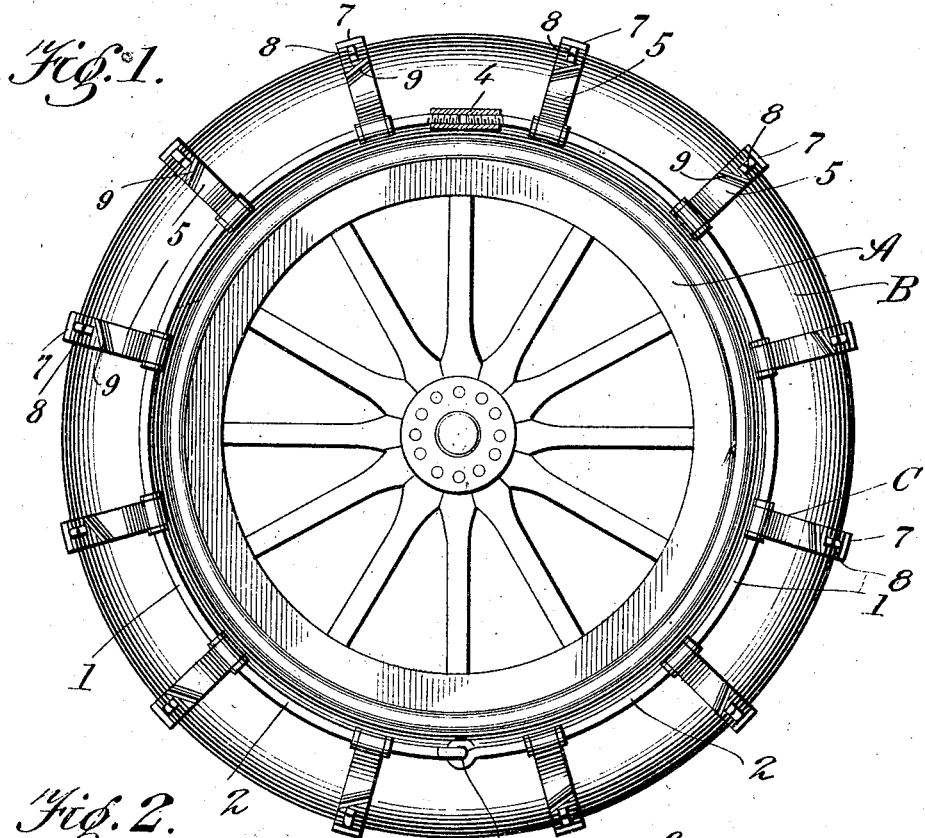
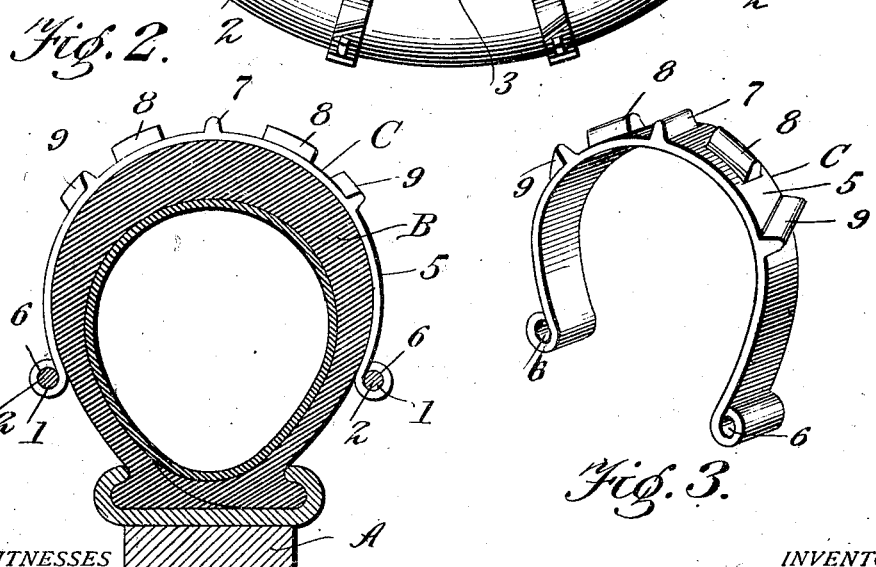
WITNESSES
INVENTORS
Harry W. White
Aurin T. Sheldon
By
Attorney

UNITED STATES PATENT OFFICE.

HARRY W. WHITE AND AURIN T. SHELDON, OF ATCHEE, COLORADO.

ANTISKIDDING DEVICE FOR VEHICLE-TIRES.

1,152,065.   Specification of Letters Patent.   Patented Aug. 31, 1915.

Application filed September 21, 1912. Serial No. 721,609.

*To all whom it may concern:*

Be it known that we, HARRY W. WHITE and AURIN T. SHELDON, citizens of the United States, residing at Atchee, in the county of Garfield and State of Colorado, have invented certain new and useful Improvements in Antiskidding Devices for Vehicle-Tires, of which the following is a specification.

This invention relates to improvements in tire armor and has particular application to anti-skidding devices for vehicle tires.

In carrying out the present invention, it is our purpose to provide a device of the class described which when applied to the wheel tire will prevent or eliminate "skidding" or sliding of the tires on wet streets or roadways incident to inclement weather.

It is also our purpose to provide an antiskidding device for the tires of vehicle wheels which will embrace the desired features of simplicity, efficiency and durability coupled with cheapness of cost in manufacture and marketing and which may be readily and quickly applied to and detached from the tire.

With the above and other objects in view, the invention consists in the construction, combination and arrangement of parts hereinafter set forth in and falling within the scope of the claim.

In the accompanying drawing, Figure 1 is a side elevation of a vehicle wheel showing my invention applied to the tire thereof. Fig. 2 is a fragmentary transverse sectional view through the device. Fig. 3 is a detail perspective view of one of the tread members.

Referring now to the accompanying drawing in detail, A indicates a suitable form of vehicle wheel to the rim or periphery of which is fastened in any usual manner the tire B, the latter being of any preferred or ordinary construction.

Our improved tire armor or anti-skidding device is indicated as an entirety by the reference letter C and, in the present instance, comprises a pair of attaching devices 1, 1, each composed of a ring formed of two sections 2, 2. One end of each section 2 is suitably bent upon itself to form an eye 3 and receives the eye at the adjacent end of the other section whereby a pivotal connection between the sections of the attaching devices is formed. The opposite or free ends of the sections 2, 2 of each attaching device are, in this form of our invention, threaded in relatively opposite directions to receive a correspondingly threaded turn buckle 4. By means of this construction, an adjustable connection is brought about between the free ends of the sections of each ring, for a purpose which will presently appear. The attaching devices thus constructed are applied to the opposite sides of the tire B, as clearly illustrated in the drawing, while spanning the tread of the tire and the space between the attaching devices are a number of tread members 5 arranged at appropriate distances apart about the circumference of the tire so as to prevent skidding on wet roadways and the like. Each tread member, in the present instance, is composed of a strip of suitable yieldable material and has its opposite ends looped about the attaching devices, as by bending the ends to form eyes 6. The tread members are each further formed with a center longitudinally disposed calk 7, transverse calks 8 at the opposite sides of the center calk, and obliquely arranged calks 9 beyond the second-named calks. This arrangement of the calks produces a maximum gripping surface so that skidding is practically eliminated.

From the foregoing description taken in connection with the accompanying drawing, the construction and manner of employing our invention will be readily apparent. With the various parts of our armor or anti-skidding device assembled, it is only necessary to detach the adjustably connected ends of the sections of the attaching devices to apply the device to the tire. When the said ends have been separated, the sections of the attaching devices are swung about their pivotal connections, at which time the anti-skidding device as an entirety may be readily applied to the tire. The free ends of the sections are now connected together by means of the turn buckle and by tightening the latter, any desired tension may be placed upon the rings and consequently the tread members.

While we have herein shown and described one form of our invention by way of illustration, we desire to have it understood that we do not limit or confine ourselves to the precise details of construction herein described and delineated, as modification and variation may be made within the scope of the claim and without departing from the spirit of the invention.

We claim:

The combination with a vehicle tire, of an anti-skidding device therefor comprising tread members having their extremities formed into eyes that lie below the center of the tire and sectional annular rings passing through the eyes, each of said tread members having its outer surface provided with a centrally arranged calk having its axis lying parallel to the axis of the tire, a pair of calks disposed upon opposite sides of the center calk and having their axes lying at right angles to the axis of the center calk, and a second pair of calks having their axes arranged at an angle to each other and to the three first mentioned calks.

In testimony whereof we affix our signatures in presence of two witnesses.

HARRY W. WHITE.
AURIN T. SHELDON.

Witnesses:
  BEN H. COX,
  SAMUEL BUTLER.